Jan. 3, 1956  F. SCHMIDT  2,729,078
COUPLING FOR TRANSMITTING VIBRATION-FREE ROTATIONAL MOTION
Filed March 23, 1953
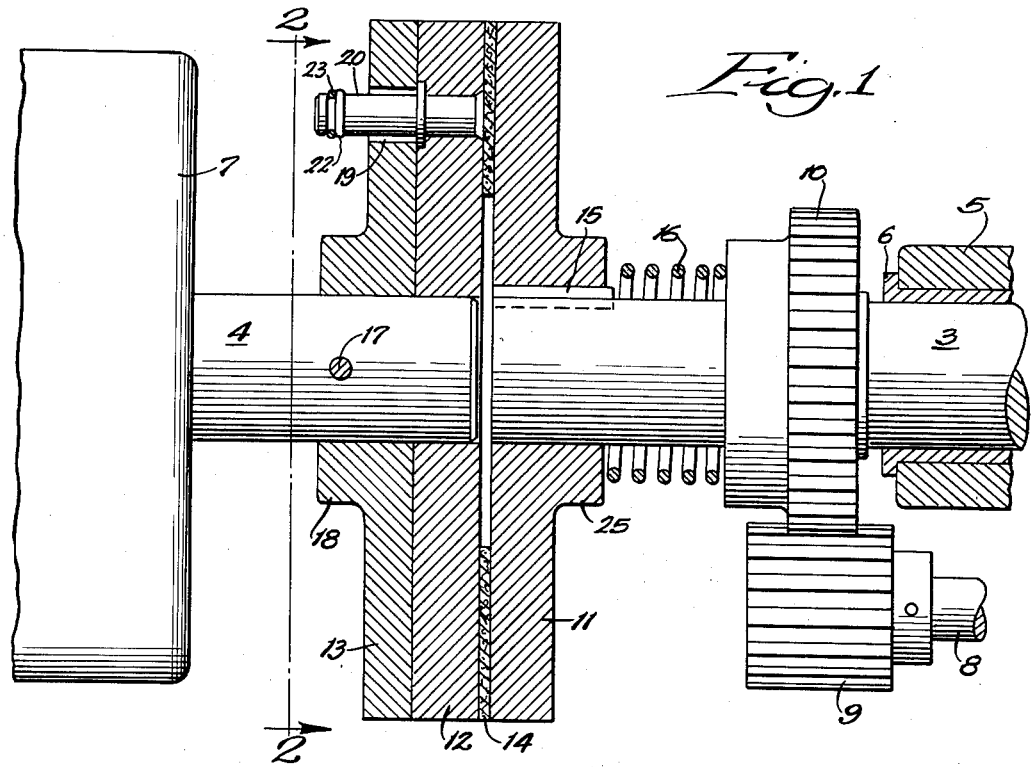
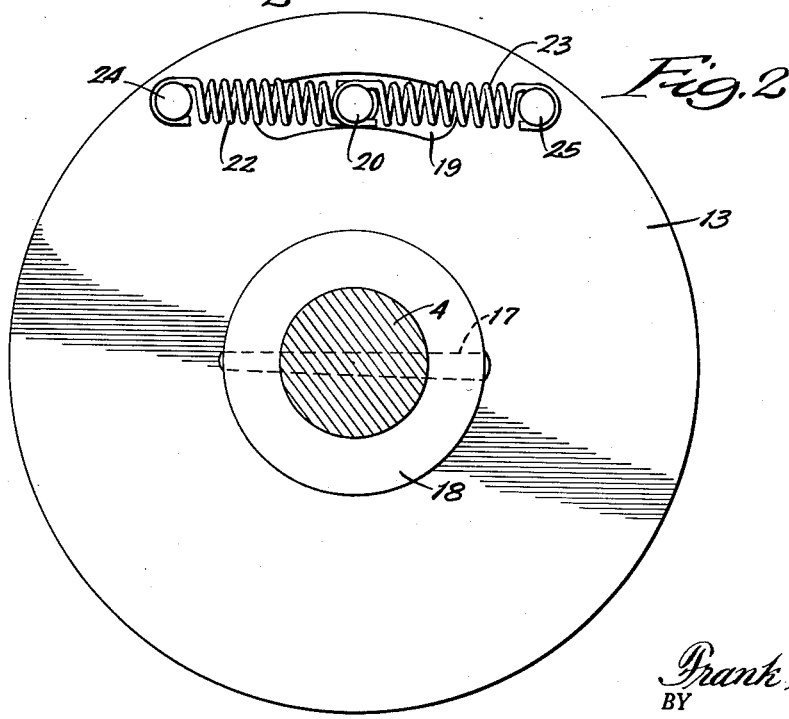
INVENTOR:
Frank Schmidt,
BY
Bair, Freeman & Molinare
ATTORNEYS.

United States Patent Office 2,729,078
Patented Jan. 3, 1956

2,729,078

COUPLING FOR TRANSMITTING VIBRATION-FREE ROTATIONAL MOTION

Frank Schmidt, Chicago, Ill., assignor to Streeter-Amet Company, Chicago, Ill., a corporation of Illinois Application March 23, 1953, Serial No. 343,827

5 Claims. (Cl. 64—30)

This invention relates to a coupling device capable of transmitting rotational motion from a power source to a power receiver without simultaneously transmitting extraneous oscillations from the power source.

In conventional means for transmission of rotational motion it is the practice to couple the driving shaft rigidly to the driven shaft. In many kinds of apparatus the driven mechanism, e. g. a sensitive control device, is responsive to extraneous oscillations or torque vibrations as well as directed rotational movements. A rigid connection is incapable of differentiating between the two, with the result that the extraneous oscillations transmitted cause improper functioning of the driven mechanism. The problem of insulating a sensitive driven mechanism from these extraneous oscillations (hereinafter referred to as vibrations) originating in the power source is complicated by the fact that vibrations of different types cannot be effectively removed by the same mechanism.

The primary object of the present invention is to provide a coupling device capable of transmitting vibration-free rotational motion. A further object is to provide a mechanical coupling which intercepts from a driving shaft vibrations varying over a substantial range in the order of two to five cycles per second.

Another object is to provide a purely mechanical coupling device which not only efficiently intercepts vibrations normally transmitted to the driven shaft, but which may be readily constructed from few parts. These and other objects will appear more fully from the following description and accompanying drawing in which Figure 1 is a side view, partially in section, of my novel coupling construction, and Figure 2 is a view taken along the line 2—2 of Figure 1.

Referring to the drawing, the driving shaft 3 is journalled in bearing 5 having a smooth sleeve 6 of soft metal. Both the bearing 5 and the shaft 3 are shown as terminating at the margin of the drawing, but it is to be understood that the bearing may be sufficiently long to rigidly support shaft 3 in cantilever fashion. Gear 10 is rigidly fixed to shaft 3, spaced slightly from the end of bearing 5 and meshes with pinion 9, driven by a source of power (not shown), for example, a selsyn motor, through shaft 8, which may be the shaft of the power source. Shaft 8 is subject to extraneous vibrations which are transferred to shaft 3.

A relatively thick disc 11 bored to slide over the end of shaft 3 and having a hub 25 is locked against rotational motion with respect to shaft 3 by means of key 15 which slides into cooperating matched slots in the shaft and in the bearing surface of disc 11. Thus, the disc is capable of moving axially along the shaft, but will not rotate about the shaft. Disc 11 is mounted on shaft 3 with the hub 25 facing gear 10, its flat face turned oppositely.

A stub shaft 4, referred to herein as the "driven shaft," extends from any vibration-sensitive mechanism 7, for example, a step cam, which is to be driven by the coupling device of the invention, and is aligned with driving shaft 3. Mounted adjacent to one another on shaft 4 are two discs, 12 and 13, approximately the same diameter as disc 11. Disc 12 is flush with the end of shaft 4 and is adapted to rotate freely about that shaft. Disc 12, unlike discs 11 and 13, has no hub, but both its faces are flat and smooth. Disc 13, identical to disc 11, has a hub 18, and is mounted on shaft 4 with the hub facing the driven mechanism 7. This disc is locked to the shaft by means of a tapered pin 17 lodged in a correspondingly tapered bore running through the hub 18 of the disc and shaft 4. In this manner, disc 13 is secured against both rotational and axial motion with respect to the shaft. Disc 13 also has an arcuate slot 19 spaced inwardly from its periphery and extending completely through the disc. The side walls of said slot are preferably concentric with the disc and the shaft on which the disc is mounted. The purpose of the slot 19 will become apparent as this description proceeds.

Disc 12, which rotates freely about the shaft 4, lies between the flat faces of discs 11 and 13 and is, therefore, referred to as an intermediate disc. The face of disc 12 which is adjacent to disc 11, has a substantial portion of its area covered with a conventional frictional surfacing material 14, such as that used for clutch facing. Although I have shown the frictional surfacing material secured to the disc 12, it is to be understood that this material may equally as well be secured to the adjacent face of disc 11.

A coil spring 16 adapted to fit over the shaft 3 is provided to exert yieldable pressure against disc 11 (which is capable of axial movement) to urge said disc towards disc 12 and compress frictional material 14 therebetween. Spring 16 is compressed against the outer face of gear 10, as disc 11 is slid onto shaft 3. The extent to which the spring is compressed regulates the magnitude of the force urging discs 11 and 12 into frictional engagement. In normal operation, the flat outer face of disc 11 is flush with the end of shaft 3, thus fixing the space between disc 11 and gear 10 occupied by spring 16. Obviously, the yieldable compressive force may be varied by changing the size of the spring, since the space provided for the spring remains constant.

Disc 12 has pin 20 rigidly secured to and projecting outwardly from its face adjacent to disc 13 and so located radially as to extend through slot 19 of disc 13. The diameter of pin 20 is sufficiently less than the width of slot 19 to provide substantial clearance therebetween. To couple disc 13 yieldably to disc 12, I have provided a pair of identical coil springs, 22 and 23, one end of each spring being hooked over the end of pin 20 and the opposite ends of said springs being fixed to pins 24 and 25, secured to the exposed face of disc 13. Pins 24 and 25 are equally spaced from the center of slot 19, and preferably, the centers of these pins are aligned with the center of the slot. In this way, under static conditions, pin 20 is retained at the mid-point of slot 19 since springs 22 and 23 exert equal tension in opposite directions. Pin 20 has a circumferential groove near its outer end in which the loop ends of the coil springs 22 and 23 lie. Pins 24 and 25 are constructed similarly to pin 20, but, of course, are shorter so that all three pins project an equal distance above the surface of disc 13.

During normal operation of the device illustrated the magnitude of directed rotation may range from an arc of a few degrees to a number of consecutive revolutions, and may be in either direction. Undesirable oscillations or torque vibrations in the power source may range in frequency from 2 to 5 cycles per second and are relatively low in amplitude. The higher frequency low amplitude vibrations, i. e. those in the upper range of frequencies mentioned, are not transmitted from disc 11 to disc 12 because frictional engagement permits sufficient differential movement therebetween to prevent this motion from being transferred. However, the lower frequency low amplitude vibrations, i. e. those in the lower range of frequencies mentioned, are transmitted through this frictional assemblage and it is, therefore, necessary to intercept these vibrations by other means to prevent transfer to vibration-sensitive mechanism 7. This means is provided in the construction disclosed for transmitting rotational motion from disc 12 to disc 13. As disc 12 rotates pin 20 revolves with it increasing the tension on either spring 22 or 23, depending upon the direction of rotation. These springs are of such load capacity that they will not become distended under the loads imposed by directed high amplitude rotation during normal operation of the device, but will distend when subjected to the low frequency vibrations, which, of course, are low amplitude oscillations. Therefore, the lower frequency vibrations which pass the first vibration-intercepting means and are present in rotating disc 12, are completely absorbed by springs 22 and 23. In this manner, vibration-free rotational motion is imparted to disc 13 and transmitted to driven mechanism 7 through shaft 4.

While I have illustrated a preferred form of the coupling device of my invention, it will be apparent that the invention is capable of many modifications. For that reason I do not wish to limit myself to the specific mechanism illustrated, but rather by the broader terminology of the appended claims.

What is claimed is:

1. In a device for transmitting vibration-free rotational motion, a first shaft, a second shaft aligned with said first shaft, a first disc mounted on said first shaft so as to rotate therewith and move axially thereof, a second disc fixed to said second shaft having a slot therethrough, an intermediate disc adjacent said first and second discs rotatably mounted on one of said shafts, frictional material between said first disc and said intermediate disc, yieldable pressure means urging said first disc into frictional engagement with said intermediate disc to transmit rotational motion therebetween, said intermediate disc having a pin projecting from the face adjacent said second disc and adapted to move within said slot, and resilient means for yieldingly securing said pin to said second disc, whereby rotational motion is transmitted from said intermediate disc to said second disc.

2. In a device for transmitting vibration-free rotational motion, a first shaft, a second shaft aligned with said first shaft, a first disc mounted on said first shaft so as to rotate therewith and move axially thereof, a second disc fixed to said second shaft having an arcuate slot therethrough with sides concentric with said second shaft, an intermediate disc adjacent said first and second discs rotatably mounted on one of said shafts, frictional material between said first disc and said intermediate disc, yieldable pressure means urging said first disc into frictional engagement with said intermediate disc to transmit rotational motion therebetween, said intermediate disc having a pin projecting from the face adjacent said second disc and adapted to move circumferentially within said slot, and resilient means for yieldingly securing said pin to said second disc, whereby rotational motion is transmitted from said intermediate disc to said second disc.

3. In a device for transmitting vibration-free rotational motion, a first shaft, a second shaft aligned with said first shaft, a first disc mounted on said first shaft so as to rotate therewith and move axially thereof, a second disc fixed to said second shaft having an arcuate slot therethrough with sides concentric with said second shaft, an intermediate disc adjacent said first and second discs rotatably mounted on one of said shafts, frictional material between said first disc and said intermediate disc, a coil spring encircling said first shaft behind said first disc, said spring being normally compressed to urge said first disc into frictional engagement with said intermediate disc to transmit rotational motion therebetween, said intermediate disc having a pin projecting from the face adjacent said second disc and adapted to move circumferentially within said slot, and resilient means for yieldingly securing said pin to said second disc, whereby rotational motion is transmitted from said intermediate disc to said second disc.

4. In a device for transmitting vibration-free rotational motion, a first shaft, a second shaft aligned with said first shaft, a first disc mounted on said first shaft so as to rotate therewith and move axially thereof, a second disc fixed to said second shaft having an arcuate slot therethrough with sides concentric with said second shaft, an intermediate disc adjacent said first and second discs rotatably mounted on one of said shafts, frictional material between said first disc and said intermediate disc, yieldable pressure means urging said first disc into frictional engagement with said intermediate disc to transmit rotational motion therebetween, said intermediate disc having a pin projecting from the face adjacent said second disc and adapted to move circumferentially within said slot, a pair of coil springs in tension each having one end attached to said pin and the opposite end attached to said second disc, whereby rotational motion is transmitted from said intermediate disc to said second disc.

5. In a device for transmitting vibration-free rotational motion, a first shaft, a second shaft aligned with said first shaft, a first disc mounted on said first shaft so as to rotate therewith and move axially thereof, a second disc fixed to said second shaft having an arcuate slot therethrough with sides concentric with said second shaft, an intermediate disc adjacent said first and second discs rotatably mounted on one of said shafts, frictional material between said first disc and said intermediate disc, coil spring encircling said first shaft behind said first disc, said spring being normally compressed to urge said first disc into frictional engagement with said intermediate disc to transmit rotational motion therebetween, said intermediate disc having a pin projecting from the face adjacent said second disc and adapted to move circumferentially within said slot, a pair of coil springs in tension each having one end attached to said pin and the opposite end attached to said second disc whereby rotational motion is transmitted from said intermediate disc to said second disc.

References Cited in the file of this patent

UNITED STATES PATENTS 2,151,724     Wengel et al.     Mar. 28, 1939